United States Patent
Sun et al.

(10) Patent No.: US 11,210,549 B2
(45) Date of Patent: Dec. 28, 2021

(54) AUTOMATED CHUTE FULLNESS DETECTION

(71) Applicant: ZEBRA TECHNOLOGIES CORPORATION, Lincolnshire, IL (US)

(72) Inventors: Bin Sun, Vernon Hills, IL (US); Yan Zhang, Buffalo Grove, IL (US); Kevin J. O'Connell, Palatine, IL (US); Yun Fu, Lincolnshire, MA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 22 days.

(21) Appl. No.: 16/824,038

(22) Filed: Mar. 19, 2020

(65) Prior Publication Data

US 2021/0295087 A1 Sep. 23, 2021

(51) Int. Cl.
*G06K 9/46* (2006.01)
*G06K 9/32* (2006.01)
*G06N 3/08* (2006.01)
*B65G 11/20* (2006.01)
*G06T 7/00* (2017.01)

(52) U.S. Cl.
CPC ............ *G06K 9/4661* (2013.01); *B65G 11/20* (2013.01); *G06K 9/3233* (2013.01); *G06N 3/08* (2013.01); *G06T 7/0002* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0177149 | A1* | 8/2006 | Friedhoff | G06K 9/4638 382/274 |
| 2011/0032389 | A1* | 2/2011 | Miyawaki | G06T 7/12 348/234 |
| 2011/0064263 | A1* | 3/2011 | de Haan | G06K 9/00979 382/100 |
| 2011/0064308 | A1* | 3/2011 | Stein | G06K 9/4638 382/170 |
| 2015/0283586 | A1* | 10/2015 | Dante | G06K 9/0063 209/577 |
| 2016/0267647 | A1* | 9/2016 | Higo | G06T 7/0004 |
| 2017/0281110 | A1* | 10/2017 | Mandelkern | A61B 6/5217 |
| 2018/0243800 | A1* | 8/2018 | Kumar | G06N 20/00 |
| 2019/0087631 | A1* | 3/2019 | Lodewyckx | G06K 9/00771 |
| 2020/0331034 | A1* | 10/2020 | Balthasar | B07C 5/342 |

* cited by examiner

*Primary Examiner* — Omar S Ismail
(74) *Attorney, Agent, or Firm* — Yuri Astvatsaturov

(57) ABSTRACT

A method includes: storing (i) a reference image of a chute for receiving objects, and (ii) a region of interest mask corresponding to a location of the chute in a field of view of an image sensor; at a processor, controlling the image sensor to capture an image of the chute; applying an illumination adjustment to the image; selecting, at the processor, a portion of the image according to the region of interest mask; generating a detection image based on a comparison of the selected portion and the reference image; determining, based on the detection image, a fullness indicator for the chute; and providing the fullness indicator to notification system.

16 Claims, 10 Drawing Sheets

AUTOMATED CHUTE FULLNESS DETECTION

BACKGROUND

Facilities that handle packages, freight and the like may contain chutes that receive such objects from other locations in the facility. Objects can be retrieved from the chute by workers, vehicles or the like for placement into containers (e.g. shipping containers, trailers and the like). The fullness of a chute (e.g. how much of the chute's volume or area is occupied by objects) may be employed by a task management system to allocate workers and other resources within the facility. Automatically assessing the fullness of a chute may be complicated, however, by variations in illumination, debris on the chute, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
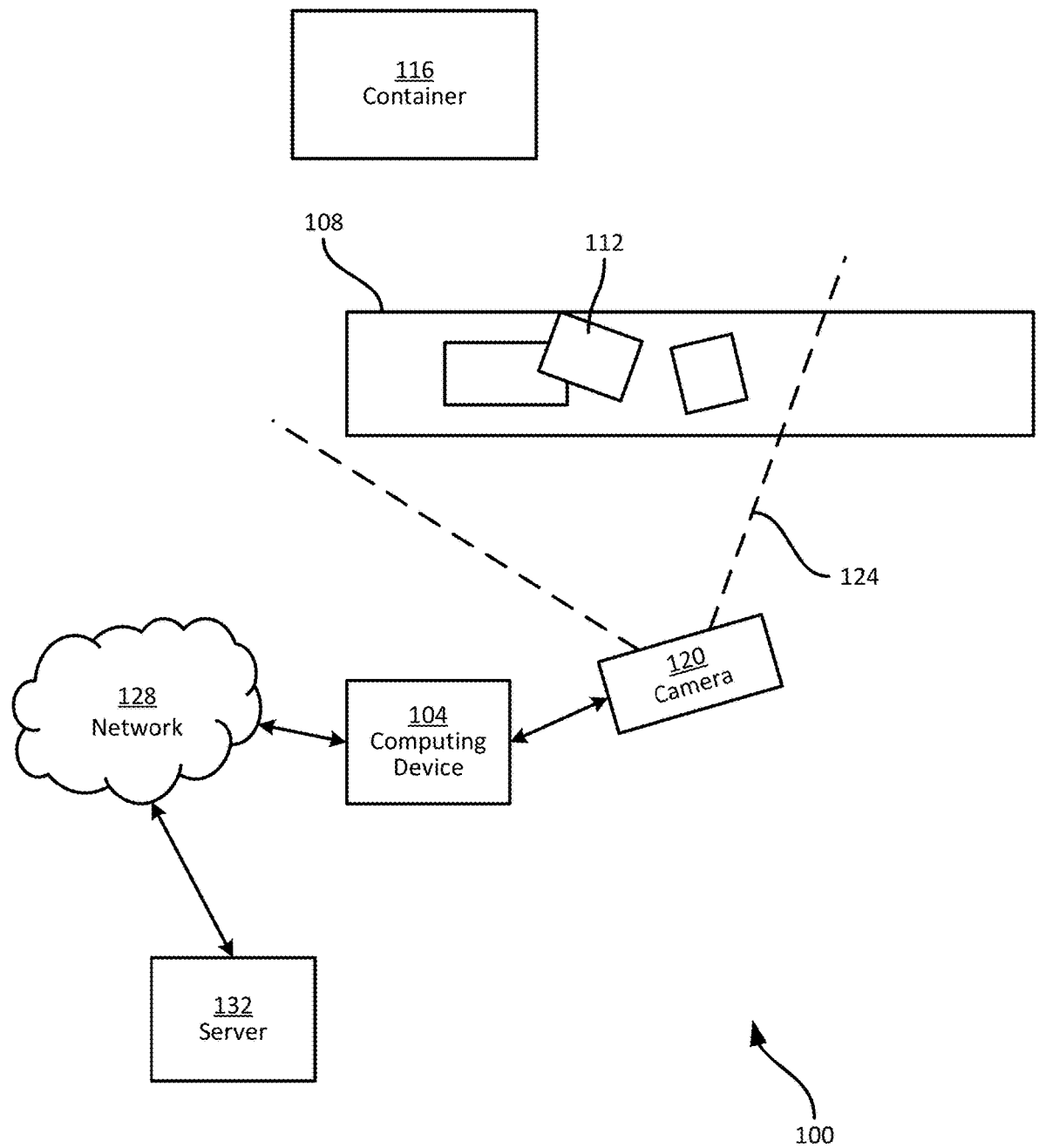
FIG. 1 is a schematic of a system for chute fullness detection.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: storing (i) a reference image of a chute for receiving objects, and (ii) a region of interest mask corresponding to a location of the chute in a field of view of an image sensor; at a processor, controlling the image sensor to capture an image of the chute; applying an illumination adjustment to the image; selecting, at the processor, a portion of the image according to the region of interest mask; generating a detection image based on a comparison of the selected portion and the reference image; determining, based on the detection image, a fullness indicator for the chute; and providing the fullness indicator to notification system.

Additional examples disclosed herein are directed to a computing device, comprising: a memory storing (i) a reference image of a chute for receiving objects, and (ii) a region of interest mask corresponding to a location of the chute in a field of view of an image sensor; and a processor configured to: control the image sensor to capture an image of the chute; apply an illumination adjustment to the image; select a portion of the image according to the region of interest mask; generate a detection image based on a comparison of the selected portion and the reference image; determine, based on the detection image, a fullness indicator for the chute; and providing the fullness indicator to notification system.

FIG. 1 depicts a system 100 for chute fullness detection. The system 100 enables a computing device 104 to generate a fullness indicator for a chute 108 at which objects 112 such as packages arrive (e.g. from another portion of the facility in which the system 100 is deployed, via conveyor belts or the like). The objects 112 may be retrieved from the chute 108, e.g. by workers, vehicles or the like, and placed into a container 116 for transport. Additional containers 116 may also be present in some examples.

A notification system may be deployed in the facility to allocate workers or other resources, based at least in part on the above-mentioned fullness indicator. The fullness indicator, as will be discussed in greater detail below, can be a binary indicator of whether any objects 112 are present on the chute 108. Thus, a fullness indicator of "empty" may indicate that no objects 112 are present, while a fullness indicator of "not empty" may indicate that at least one object 112 is present on the chute 108. In other examples, the fullness indicator represents a fraction of the area or volume of the chute 108 that is occupied by objects 112. An example fullness indicator may therefore indicate that 70% of the chute 108 contains objects 112.

The above-mentioned notification system may, for example, allocate additional workers to the chute 108 if the fullness indicator is elevated. In other examples, the notification system may direct additional objects 112 to the chute 108 if the fullness indicator is low. Various other control actions may also be implemented by the notification system.

To generate the fullness indicator, the system 100 includes an image sensor, also referred to as a camera 120 connected with the computing device 104 and having a field of view 124 that encompasses at least part of the chute 108. The computing device 104 controls the camera 120 to captures images of the chute 108, and processes each captured image to generate a fullness indicator. Thus, the computing device 104 generates a stream of fullness indicators reflecting, substantially in real time, the degree to which the chute 108 is occupied by the objects 112. The fullness indicators can be provided to the above-mentioned notification system via a network 128. For example, the notification system may be implemented by a server 132 connected to the network 128. In other examples, the notification system may be implemented by the computing device 104 itself.

The camera 120 captures two-dimensional color images of the chute 108, and the computing device 104 is configured to process each image to generate a fullness indicator for the chute 108. As will be seen below, in order to generate the fullness indicator, the computing device 104 may be configured to compensate for changes in illumination of the chute 108, as well as to detect and remove noise such as small debris on the chute 108.

Figure 2:
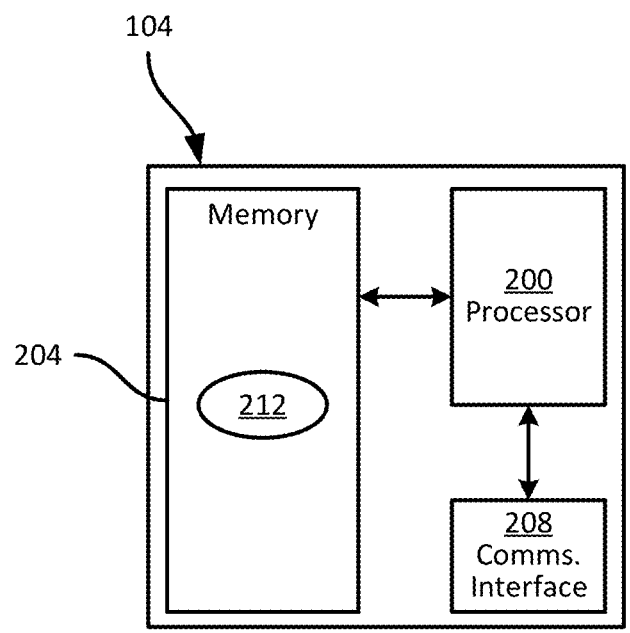
FIG. 2 is a block diagram of certain internal hardware components of the computing device of FIG. 1.

Turning to FIG. 2, certain internal components of the computing device 104 are illustrated. The computing device 104 includes a controller, such as a processor 200, interconnected with a non-transitory computer readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits. The computing device 104 also includes a communications interface 208 enabling the computing device 104 to exchange data with other devices such as the server 132, e.g. via the network 128.

The memory 204 stores computer readable instructions for execution by the processor 200. In particular, the memory 204 stores a fullness indicator generation application 212 which, when executed by the processor 200, configures the processor 200 to process images of the chute 108 captured via the camera 120 to generate fullness indicators. Those skilled in the art will appreciate that the functionality implemented by the processor 200 via the execution of the application 212 may also be implemented by one or more specially designed hardware and firmware components, such as FPGAs, ASICs and the like in other embodiments.

Figure 3:
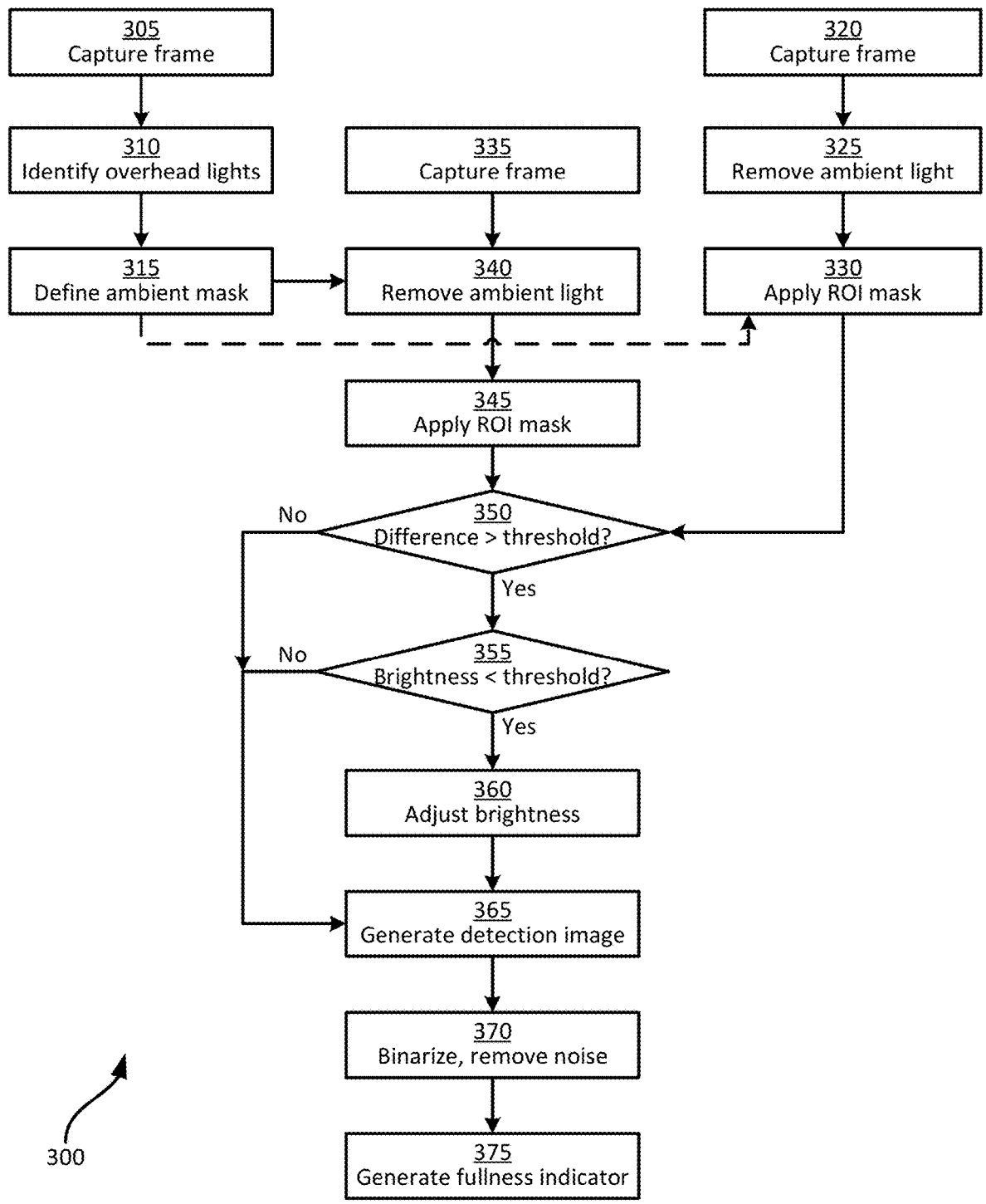
FIG. 3 is a flowchart of a method of chute fullness detection.

Turning now to FIG. 3, the functionality implemented by the computing device 104 will be discussed in greater detail. FIG. 3 illustrates a method 300 of automatically detecting chute fullness, which will be discussed below in conjunction with its performance by the computing device 104 in the system 100.

Prior to generating fullness indicators, the computing device 104 obtains an ambient illumination mask, and a reference image of the chute 108. The reference image of the chute 108 depicts the chute 108 in an empty state, to establish a baseline against which further images of the chute 108 in various states of fullness can be assessed. The ambient illumination mask and reference image may be obtained at the time of deployment of the system 100, for example, and may be stored (e.g. in the memory 204) for use in subsequent performances of the method 300. Specifically, the ambient illumination mask can be obtained via the performance of blocks 305 to 315 of the method 300, and the reference image can be obtained via the performance of blocks 320 to 330 of the method 300. Subsequent performances of the method 300 can then omit blocks 305 to 330, and employ the stored results of those blocks.

Figure 4:
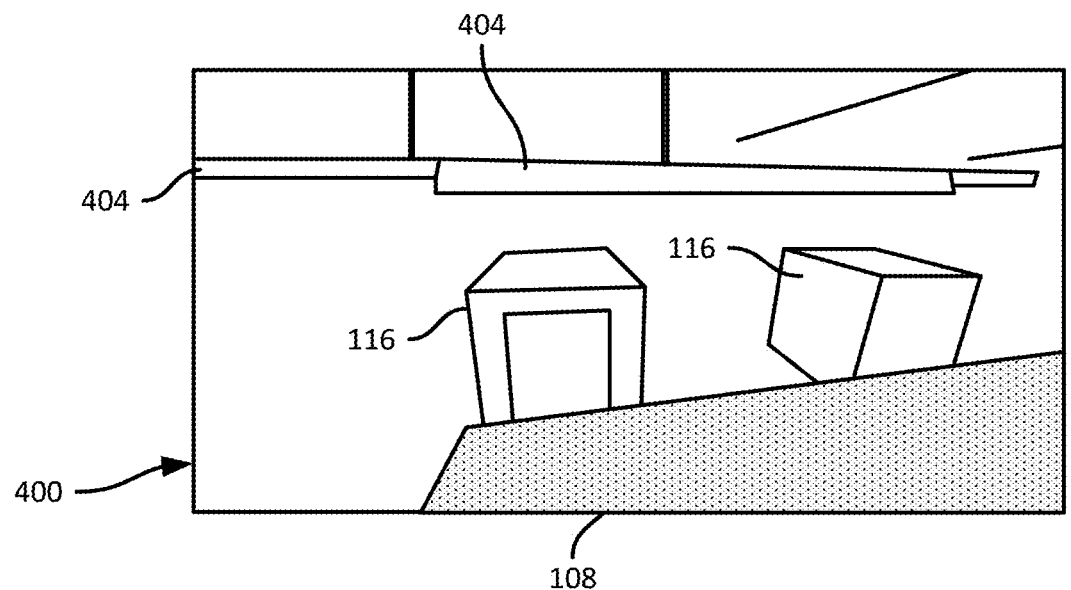
FIG. 4 is a diagram illustrating a performance of blocks 305 and 310 of the method of FIG.
Figure 4:
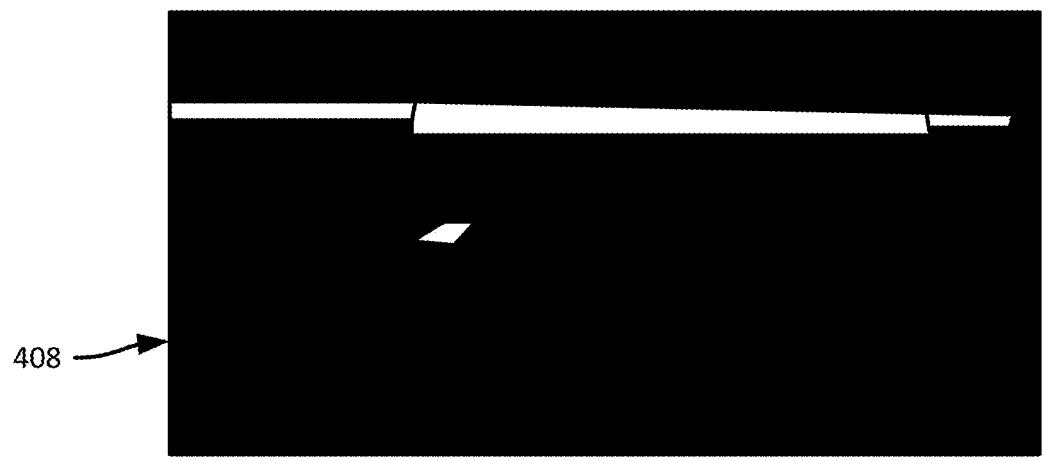

Beginning with the ambient illumination mask, at block 305 the computing device 104 obtains an image (also referred to as a frame) of the chute 108 via the camera 120. Turning to FIG. 4, an image 400 is shown, in which the chute 108 and two containers 116 are visible. Also visible in the image 400 are overhead lights 404, e.g. suspended from a ceiling of the facility in which the system 100 is deployed. At block 310, the computing device 104 is configured to identify the overhead lights 404 in the image 400. For example, still referring to FIG. 4, the computing device 104 can apply a grayscale threshold to the image 400 to generate a binarized image 408, in which the overhead lights 404 are set to a high value, while the remainder of the image 400 is set to a low value. As will be apparent, the overhead lights 404 are likely to have a greater intensity than the remainder of the image 400. The threshold applied to the image 400 may therefore be selected to set all pixels but those with near-maximal intensity to a low value (e.g. black, or zero). For example, a grayscale threshold of 210 (e.g. for grayscale values of 0 to 255) may be employed.

The overhead lights 404 are detected in the binarized image 408 by locating the largest contiguous region of high-value pixels. In the illustrated example, in addition to the overhead lights 404, the binarized image 408 contains a small high-value region, which may originate from a reflection on a container 116, for example. The region corresponding to the overhead lights 404 is larger, however, and is therefore selected at block 310.

Figure 5:
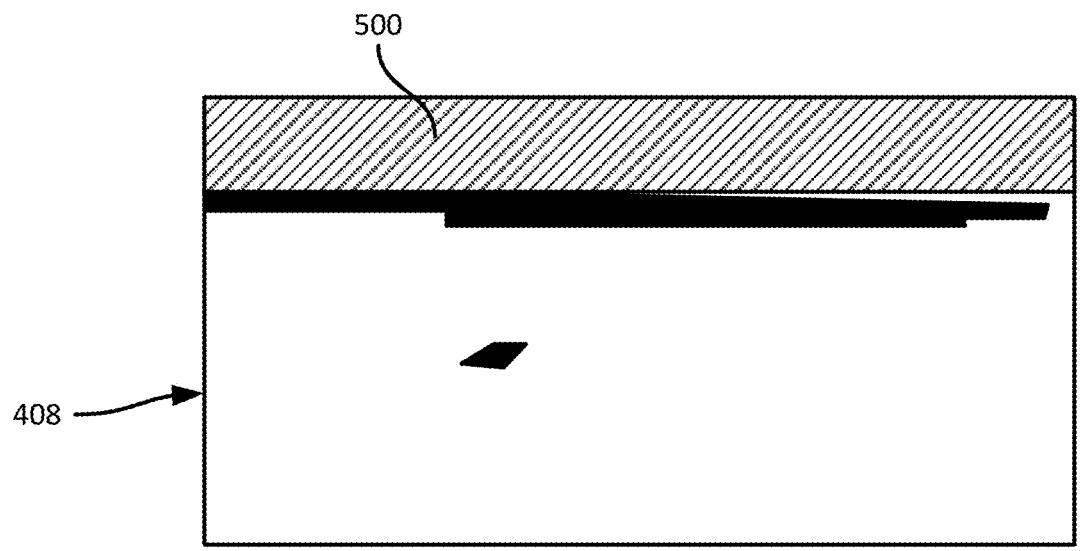
FIG. 5 is a diagram illustrating a performance of block 315 of the method of FIG. 3.

At block 315, the computing device defines the ambient illumination mask based on the detected position of the overhead lights in the binarized image 408. Turning to FIG. 5, an inverted version of the binarized image 408 is illustrated, and an ambient illumination mask 500 is shown. The mask 500 indicates a region located above (e.g. vertically) the overhead lights 404. In images captured by the camera 120, the pixels contained in the region indicated by the mask 500 correspond to the ceiling of the facility in which the system 100 is deployed. Objects, shadows, and the like are unlikely to appear on the ceiling, and the pixels within the mask 500 in any given image captured by the camera 120 therefore provide a representation of ambient light levels in the facility that is largely free of noise. As will be apparent, ambient light levels may change due to changes in the overhead lights 404, light entering the facility from windows, and the like.

Figure 6:
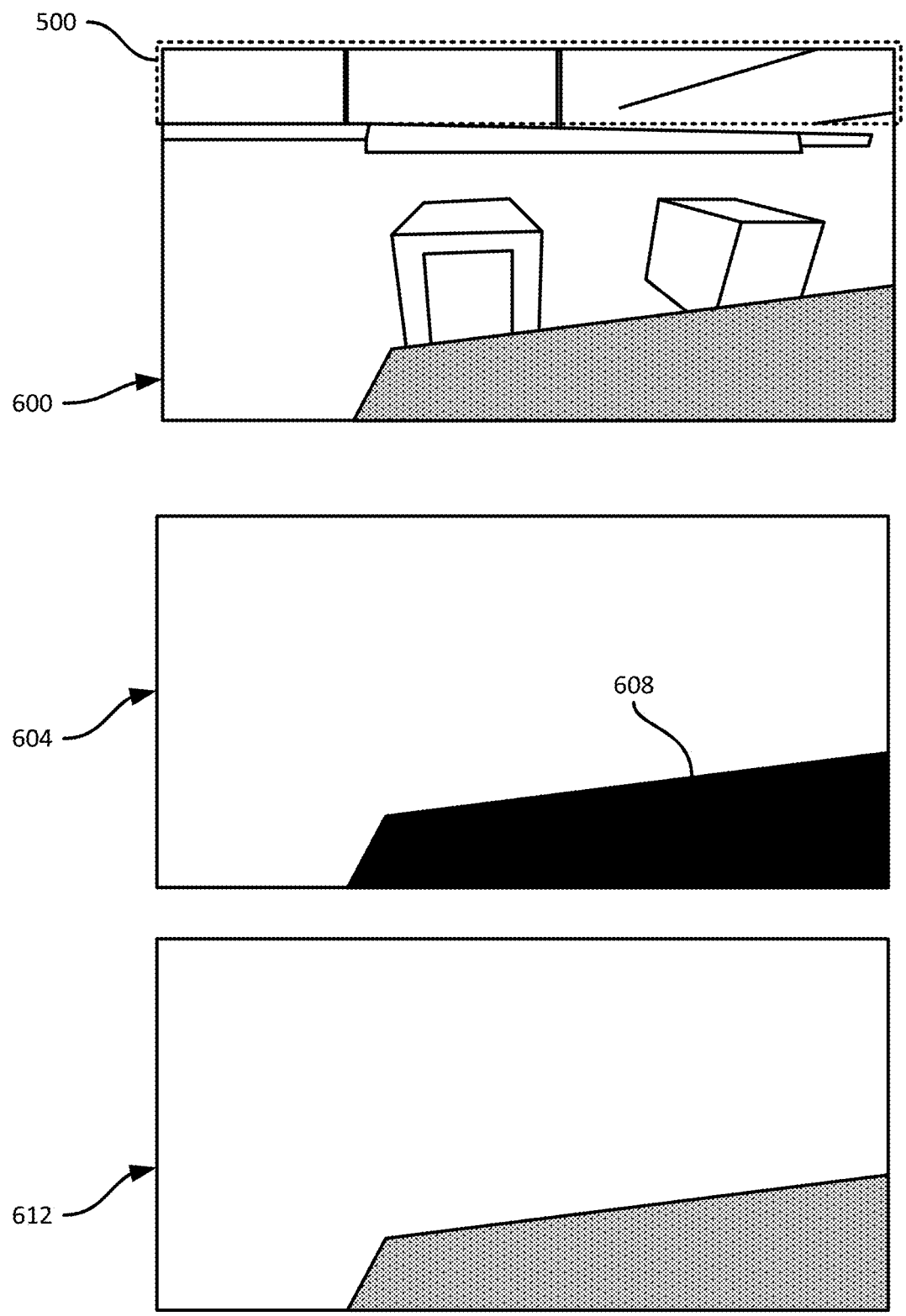
FIG. 6 is a diagram illustrating a performance of blocks 320 to 330 of the method of FIG. 3.

Returning to FIG. 3, generation of the reference image begins at block 320. In particular, the computing device 104 is configured to obtain a frame via the camera 120. The frame used at block 320 can be the same frame as employed at block 305 (e.g. the frame 400). The frame captured at block 320 depicts the chute 108 in an empty state, as noted earlier. At block 325, the computing device 104 is configured to remove ambient light from the frame 400, using the ambient illumination mask described above. In particular, referring to FIG. 6, the computing device 104 selects the region within the mask 500, generates mean channel values (e.g. red, green and blue) from the pixels within the mask 500, and subtracts the mean channel values from the remainder of the frame 400. The resulting frame 600, shown in FIG. 6, is therefore adjusted to remove at least a portion of a contribution by ambient light to the values of the pixels therein. In other words, the ambient illumination has been at least partly cancelled out in the frame 600. As a result, the region of the frame 600 containing the chute 108 is darker than as shown in FIG. 4. The remainder of the frame 600 (as with the frame 400) is similarly altered, but is shown in black and white lines for clarity of illustration.

At block 330, the computing device applies a region-of-interest (ROI) mask to the frame captured at block 320. The ROI mask can be predefined, and stored in the memory 204. The ROI mask defines an area within any frame captured by the camera 120 that contains the chute 108. Referring to FIG. 6, an ROI mask 604 is shown, defining a region 608 that contains the chute 108. Applying the mask 604 to the frame 400 results in a frame 612, also referred to as a reference image 612, in which the chute 108 is visible, but the remainder of the frame 600 has been discarded. As will be seen below, the reference image 612 is employed by the computing device 104 to distinguish between areas of the chute 108 that contain objects 112, and areas of the chute 108 that do not contain objects 112.

In other examples, the removal of ambient light at block 325 can be performed after the application of the ROI mask at block 330, rather than before application of the ROI mask as shown in FIG. 3. In such examples, the processing involved in removing ambient light may be reduced as the removal need only be performed on the image data remaining after application of the ROI mask.

Figure 7:
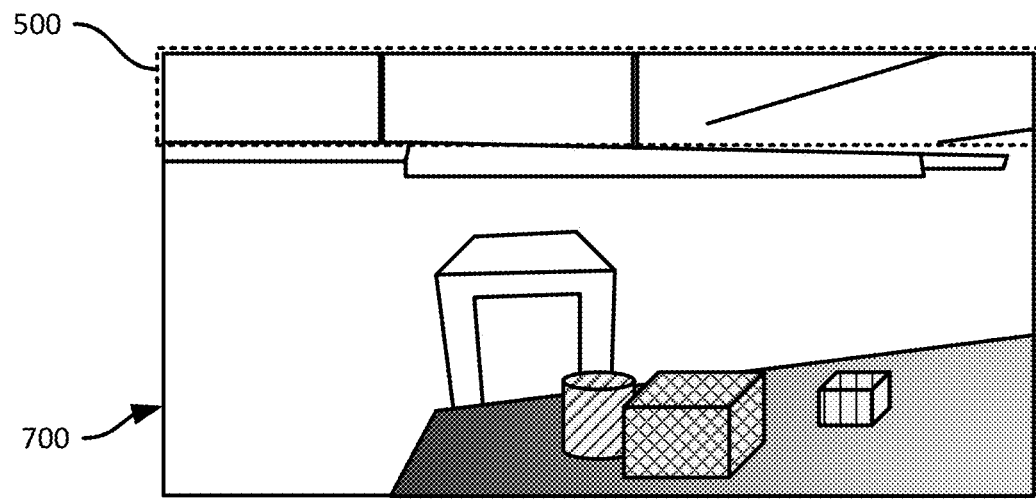
FIG. 7 is a diagram illustrating a performance of blocks 335 and 340 of the method of FIG. 3.
Figure 7:
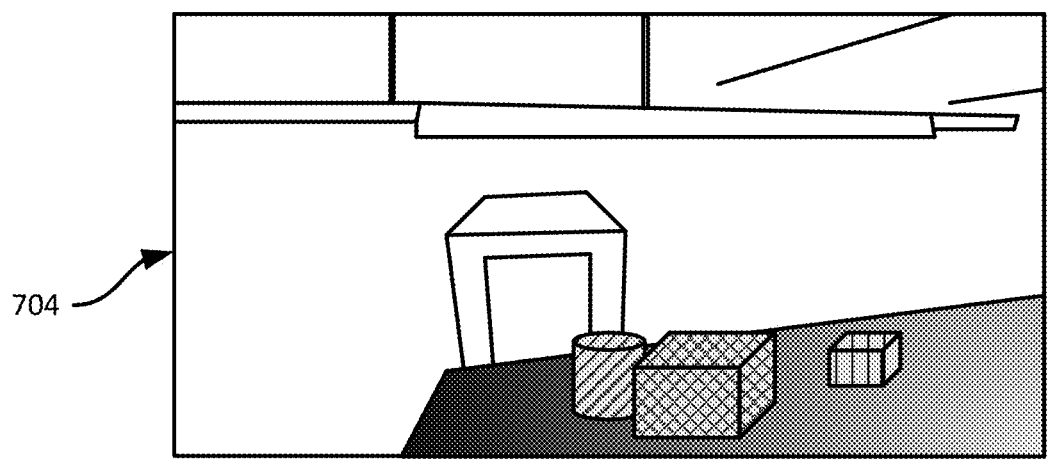

Returning to FIG. 3, when the ambient illumination mask 500 and the reference image 612 have been defined, generation of fullness indicators can begin. Specifically, at block 335 the computing device 104 controls the camera 120 to capture a frame. Turning to FIG. 7, a frame 700 is shown as captured at an example performance of block 335. As seen in FIG. 7, the chute 108 contains three objects 112, and is unevenly illuminated (e.g. because an overhead light 404 has been disabled).

At block 340, the computing device 104 determines mean channel values of the pixels contained in the ambient illumination mask 500, as described in connection with block 325 above. The computing device 104 then subtracts the above-mentioned mean channel values from the frame 700 to generate an adjusted frame 704, also shown in FIG. 7, in which the chute 108 and objects 112 are shown to be somewhat darker. As will be apparent, removing ambient light as discussed above mitigates differences between the chute 108 as depicted in the frame 700, and the chute 108 as depicted in the reference image 612, caused by differences in light levels between the frame 600 and the frame 700.

Figure 8:
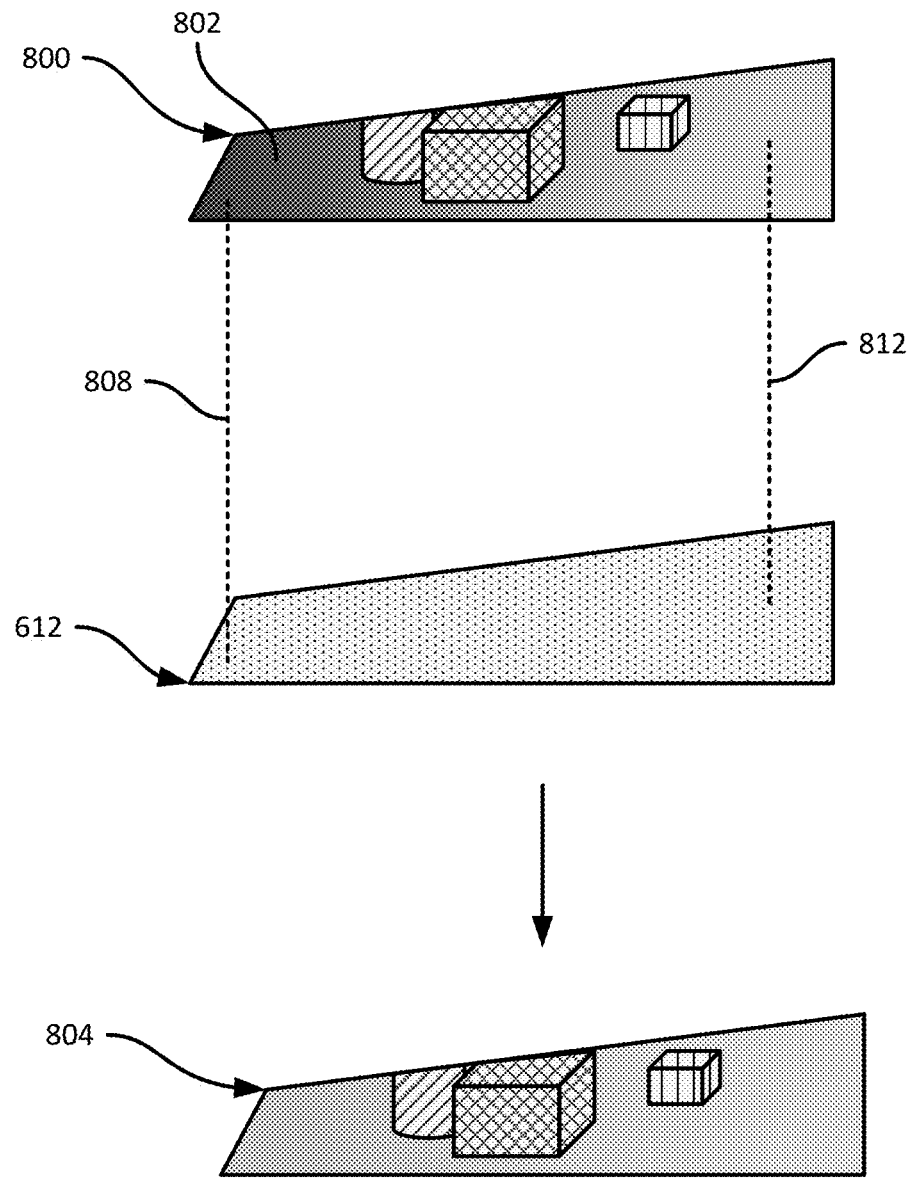
FIG. 8 is a diagram illustrating a performance of blocks 350 to 360 of the method of FIG. 3.

At block 345 the computing device 104 applies the ROI mask 604 to the adjusted frame 704, and thereby discards the portion of the frame 704 outside the chute 108 while retaining the portion of the frame 704 that depicts the chute 108. Turning to FIG. 8, a selected portion 800 of the frame 704 is shown in isolation. As noted above in connection with blocks 325 and 330, in other examples, the removal of ambient light at block 340 can be performed after the application of the ROI mask at block 345, rather than before application of the ROI mask as shown in FIG. 3.

The computing device 104 can then, at blocks 350 to 360, perform an additional illumination adjustment to the selected portion 800. As noted earlier and as seen in FIG. 8, the chute 108 is unevenly illuminated, and an area 802 of the chute, although empty, may be misclassified as containing objects 112 because it is substantially darker than the reference image 612. The adjustment performed at blocks 350-360 may mitigate such misclassification. In other examples, the above adjustment can be omitted.

Blocks 350-360 are performed for each pixel in the selected portion 800. At block 350, the computing device 104 determines a difference between the current pixel in the selected portion 800 and the corresponding pixel (i.e. the pixel having the same coordinates) in the reference image 612. The difference may be determined, for example, as a Euclidean distance based on the channel values of the two pixels. In some examples, prior to performing blocks 350 to 360 the selected portion 800 and the reference image 612 may be converted to a color space with an intensity or brightness channel, such as the CIELAB color space or the HSI color space.

When the determination at block 350 is negative, indicating that the two pixels are similar, no adjustment is made, and the next pixel is selected for processing. When the determination at block 350 is affirmative, however, the computing device 104 proceeds to block 355. As will now be apparent, a difference such as a Euclidean distance that exceeds a threshold indicates that the selected pixel in the portion 800 is different from the corresponding pixel in the reference image 612. Such a difference, however, does not necessarily indicate that the selected pixel represents an object 112. The difference may result, for example, from a poorly lit portion of the chute 108.

At block 355, the computing device 104 determines whether the brightness (e.g. the L channel in the CIELAB color space) is below a threshold. When the determination at block 355 is negative, the selected pixel is sufficiently bright that poor illumination is not likely to be the cause for the difference observed at block 350. When the determination at block 355 is affirmative, however, the selected pixel may simply be a poorly illuminated portion of the chute 108. Therefore, at block 360 the computing device 104 adjusts the brightness of the selected pixel. In particular, the computing device 104 increases the brightness of the selected pixel, e.g. by a predefined amount. In other examples, the brightness of the selected pixel can be set to the average brightness of the pixels of the reference image 612.

Referring again to FIG. 8, an adjusted frame 804 is shown resulting from the performance of blocks 350 to 360 for the selected portion 800. The chute 108 as represented in the adjusted frame 804 is more uniformly illuminated as a result of the adjustments described above. For example, a pair of pixels indicated by the dashed line 808 are sufficiently different for the determination at block 350 to be affirmative, and the pixel from the portion 800 has sufficiently low brightness that the determination at block 355 is affirmative. The resulting pixel in the adjusted frame 804 has been adjusted to a higher brightness. Other pairs of pixels in the portion 800 and reference image 612, such as those indicated by the dashed line 812, are not sufficiently different for an affirmative determination at block 350, and therefore no adjustment is made.

At block 365, the computing device 104 is configured to generate a detection image, by comparing the adjusted frame 804 to the reference image 612. For example, each pixel of the detection image may be generated by subtracting therefrom the channel values of the corresponding pixel of the reference image 612, and storing the absolute values of the results of the subtraction as the channel values in the detection image.

Figure 9:
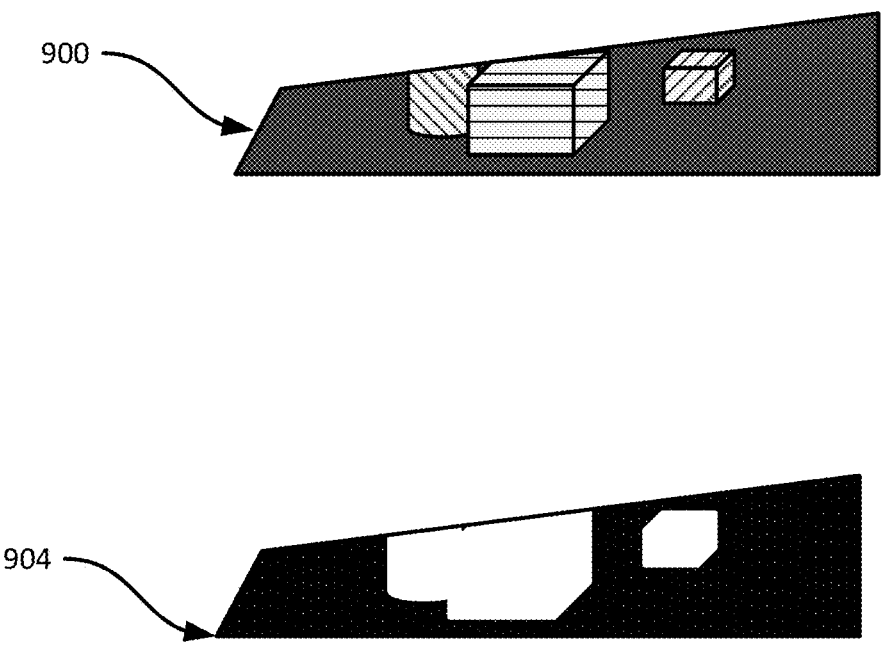
FIG. 9 is a diagram illustrating a performance of blocks 365 and 370 of the method of FIG. 3.

As will now be apparent to those skilled in the art, the above-mentioned subtraction produces pixels that are black or near black for regions of the adjusted frame 804 that are similar to the reference image 612. Regions of the adjusted frame 804 that are not similar to the reference image 612, such as the regions depicting objects 112, have colors other than black in the detection image. Turning to FIG. 9, a detection image 900 is shown in which the chute 108 is dark (having been effectively cancelled by the subtraction of the reference image 612). The regions depicting products 112 have different colors than shown in the original frame 700, but remain different from the chute 108 itself.

At block 370, the computing device 104 binarizes the detection image 900, e.g. by summing the channel values of each pixel and applying a threshold to the resulting sums. Because black pixels generally have channel values of zero, pixels depicting the chute 108 are more likely to be set to a low value as a result of the threshold. Pixels depicting the objects 112, which were not cancelled via the subtraction at block 365, generally have non-zero channel values, and are therefore more likely to be set to a high value as a result of the threshold. Therefore, as shown in a binarized detection image 904 shown in FIG. 9, the chute 108 appears in black (i.e. low pixel values), while the objects 112 appear in white (i.e. high pixel values).

The computing device 104 may also detect and remove noise at block 370. For example, following binarization of the detection image 900, the computing device 104 can perform a blob detection operation (e.g. connected components) to detect any contiguous regions of high-value pixels in the binarized detection image 904. The computing device 104 can then compare each such region to a predefined size threshold, and discard (e.g. set to black) any regions below the size threshold. As a result, small debris such as pieces of paper on the chute 108 can be ignored.

At block 375, the computing device 104 generates a fullness indicator, for example by determining a ratio of high-value pixels to total pixels in the binarized detection image 904. For example, the ratio may be about 30% for the binarized detection image 904. In other examples, the computing device can generate a binary fullness indicator, which in the case of the binarized detection image 904 is an indication that the chute 108 is not empty. The fullness indicator (either or both of the binary indicator and the ratio) can be provided to the notification system, as mentioned earlier.

Figure 10:
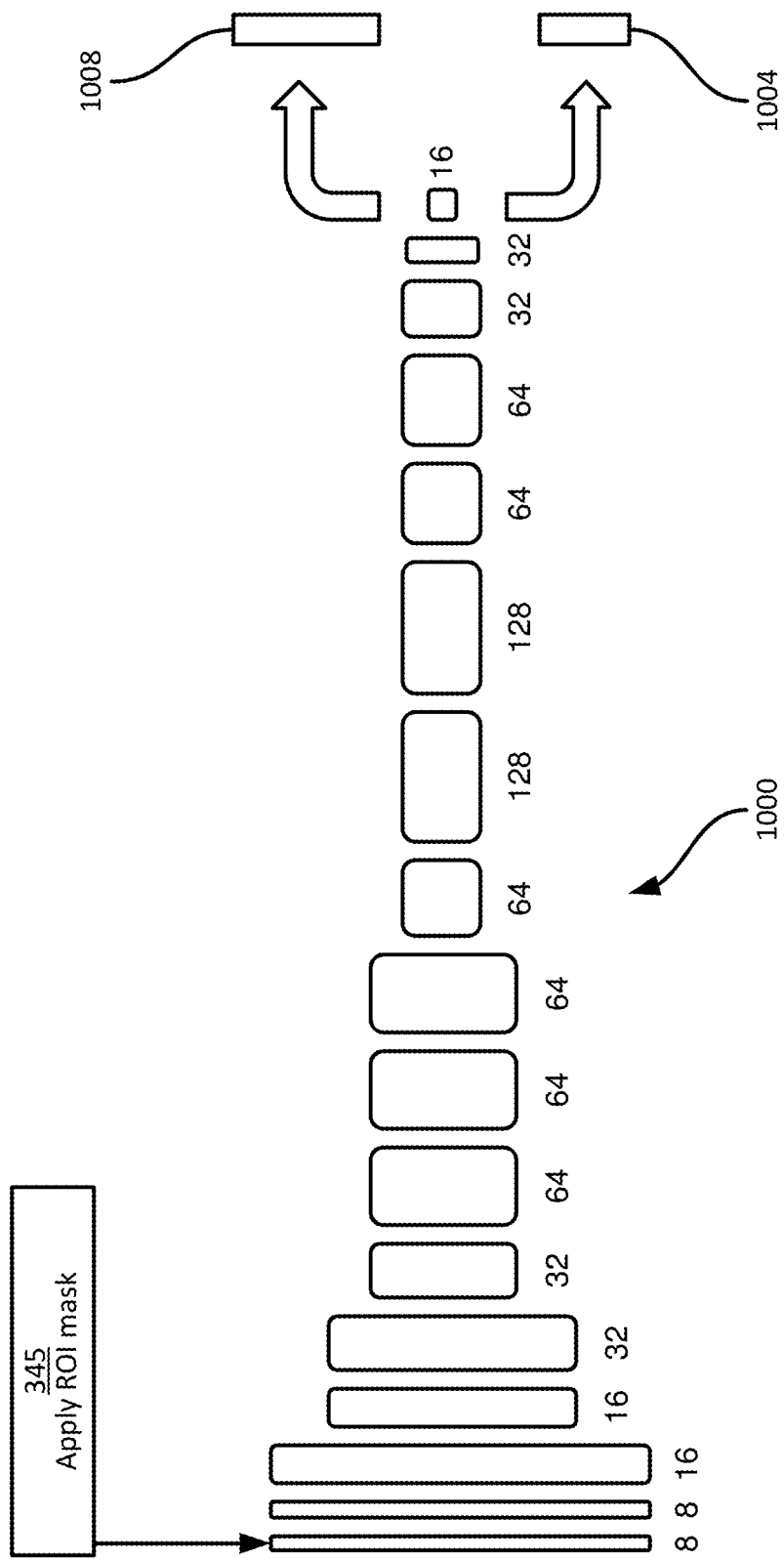
FIG. 10 is a diagram illustrating an alternative process for generating fullness indicators.

In other examples, the computing device 104 can generate the fullness indicator(s) by processing a captured image via a neural network. For example, referring to FIG. 10, a captured image (e.g. following application of the ROI mask at block 345) can be provided to a convolutional neural network (CNN) 1000. The CNN 1000 includes a plurality of layers, e.g. alternating depth-wise and point-wise convolutions. Each layer consists of a number of filters (also referred to as kernels) for application to the input. The number of kernels in each layer is indicated in FIG. 10. The output features of the CNN are provided to two separate output layers 1004 and 1008. The output layer 1004 may be, for example, an L2 loss layer configured to generate a fullness indicator in the form of a ratio. The output layer 1008 may be a Softmax loss layer configured to generate a binary fullness indicator. Of particular note, the remaining layers of the CNN 1000 are shared (i.e. between the two distinct types of fullness indicator). The CNN 1000 may be trained using the output of the method 300 (for example, the ratio fullness indicators).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   storing (i) a reference image of a chute for receiving objects, and (ii) a region of interest mask corresponding to a location of the chute in a field of view of an image sensor;
   at a processor, controlling the image sensor to capture an image of the chute;
   applying an illumination adjustment to the image;
   selecting, at the processor, a portion of the image according to the region of interest mask;
   generating a detection image based on a comparison of the selected portion and the reference image;
   determining, based on the detection image, a fullness indicator for the chute; and
   providing the fullness indicator to a notification system,
   wherein applying the illumination adjustment includes, for each pixel of the selected portion:
   determining a difference between the pixel and a corresponding pixel of the reference image;
   when the difference exceeds a threshold, determining whether a brightness of the pixel exceeds a brightness threshold; and
   when the brightness does not exceed the brightness threshold, adjusting the brightness of the pixel.

2. The method of claim 1, wherein generating the detection image includes, for each pixel defining the detection image: determining a difference between a first value of a corresponding pixel of the reference image and a second value of a corresponding pixel of the selected portion.

3. The method of claim 2, wherein determining the fullness indicator includes converting the detection image to a binary image.

4. The method of claim 3, wherein determining the fullness indicator includes determining a ratio of high-value pixels to low-value pixels in the binary image.

5. The method of claim 3, wherein determining the fullness indicator includes determining whether the binary image contains any high-value pixels.

6. The method of claim 3, further comprising:
   prior to determining the fullness indicator, detecting regions of high-value pixels; and
   discarding a subset of the regions that do not meet a size threshold.

7. The method of claim 1, further comprising storing an ambient illumination mask;
   wherein applying the illumination adjustment includes determining an ambient light level based on a region of the image corresponding to the ambient light mask; and
   subtracting the ambient light level from the image.

8. The method of claim 1, wherein adjusting the brightness includes increasing the brightness of the pixel.

9. A computing device, comprising:
   a memory storing (i) a reference image of a chute for receiving objects, and (ii) a region of interest mask corresponding to a location of the chute in a field of view of an image sensor; and
   a processor configured to:
   control the image sensor to capture an image of the chute;
   apply an illumination adjustment to the image;
   select a portion of the image according to the region of interest mask;
   generate a detection image based on a comparison of the selected portion and the reference image;
   determine, based on the detection image, a fullness indicator for the chute; and
   providing the fullness indicator to notification system,
   wherein the processor is further configured, in order to apply the illumination adjustment, to:
   for each pixel of the selected portion:
   determine a difference between the pixel and a corresponding pixel of the reference image;
   when the difference exceeds a threshold, determine whether a brightness of the pixel exceeds a brightness threshold; and
   when the brightness does not exceed the brightness threshold, adjust the brightness of the pixel.

10. The computing device of claim 9, wherein the processor is configured, in order to generate the detection image, to:
    for each pixel defining the detection image:
    determine a difference between a first value of a corresponding pixel of the reference image and a second value of a corresponding pixel of the selected portion.

11. The computing device of claim 10, wherein the processor is configured, in order to determine the fullness indicator, to convert the detection image to a binary image.

12. The computing device of claim 11, wherein the processor is configured, in order to determine the fullness indicator, to determine a ratio of high-value pixels to low-value pixels in the binary image.

13. The computing device of claim 11, wherein the processor is configured, in order to determine the fullness indicator, to determine whether the binary image contains any high-value pixels.

14. The computing device of claim 11, wherein the processor is further configured to:
    prior to determining the fullness indicator, detect regions of high-value pixels; and
    discard a subset of the regions that do not meet a size threshold.

15. The computing device of claim 9, wherein the memory stores an ambient illumination mask; and wherein the processor is configured, in order to apply the illumination adjustment, to:
    determine an ambient light level based on a region of the image corresponding to the ambient light mask; and
    subtract the ambient light level from the image.

16. The computing device of claim 9, wherein the processor is configured, in order to adjust the brightness, to increase the brightness of the pixel.

* * * * *